United States Patent [19]

Sakurai

[11] 3,956,733
[45] May 11, 1976

[54] MONITORING SYSTEM FOR AN AUTOMOBILE LIGHT CIRCUIT

[75] Inventor: Yasuhiko Sakurai, Kariya, Japan

[73] Assignee: Nippondenso Co., Ltd., Kariya, Japan

[22] Filed: Apr. 8, 1974

[21] Appl. No.: 459,211

[30] Foreign Application Priority Data
Apr. 10, 1973   Japan.............................. 48-41171
Apr. 23, 1973   Japan.............................. 48-45873
Apr. 23, 1973   Japan.............................. 48-45874

[52] U.S. Cl. .................................. 340/79; 340/80; 340/81 R; 340/251; 315/82
[51] Int. Cl.² ........................................ B60Q 1/26
[58] Field of Search ................ 340/80, 81, 251, 79, 340/72, 73, 74, 82, 83, 52, 54, 55, 67; 315/77, 82, 83, 129, 133, 130, 131, 136; 317/155.5

[56] References Cited
UNITED STATES PATENTS

| 3,421,143 | 1/1969 | Signorile | 340/251 |
| 3,500,315 | 3/1970 | Shimada | 340/82 |
| 3,508,237 | 4/1970 | Kimmelman | 340/80 |
| 3,593,274 | 7/1971 | Krugler | 340/251 |
| 3,623,055 | 11/1971 | Sakurai | 340/251 |
| 3,753,224 | 8/1973 | Martin | 340/80 |

Primary Examiner—John W. Caldwell
Assistant Examiner—Donnie L. Crosland
Attorney, Agent, or Firm—Cushman, Darby & Cushman

[57] ABSTRACT

There is provided a monitoring system for an automobile light circuit which monitors the faulty conditions of the light circuit as well as the light failures. The monitoring system comprises a light fault detecting circuit, a supply cable fault detecting citcuit, a monitoring indicator operation control citcuit, an indicator, etc.

10 Claims, 5 Drawing Figures

MONITORING SYSTEM FOR AN AUTOMOBILE LIGHT CIRCUIT

BACKGROUND OF THE INVENTION

1. Field of the Invention

The present invention relates to a monitoring system for checking a fault or faults of an automobile light circuit.

2. Description of the Prior Art

In view of ever increasing demands of late for safety of automotive vehicles, various improvements have also been made in lamps, especially headlamps on automobiles and these improvements include an increase in the number of lamps, the provision of improved actuating circuits, etc.

SUMMARY OF THE INVENTION

It is an object of the present invention to provide a highly functional monitoring system for an automobile light circuit which is capable of not only giving an indication of failures of the lamps installed in an automotive vehicle, but also monitoring whether the circuits on the load side of a light lighting switch are in normal conditions in the off condition of the lamps.

Other object of this invention is to provide the monitoring system for an automobile light circuit which has the fact that with the lamps in the off condition, it is capable of monitoring whether the circuits on the load side of a light lighting switch are not in a proper condition for supplying power to the lamps due to a wiring fault, whereas when the lamps are on it is capable of monitoring the presence of faults in the lamps. In particular, where three or more lamps are connected in parallel, the monitoring system of this invention is capable of ensuring a greatly improved accuracy of fault detection.

DESCRIPTION OF PREFERRED THE EMBODIMENT

The present invention will now be described in greater detail with reference to the illustrated embodiments.

Figure 1:
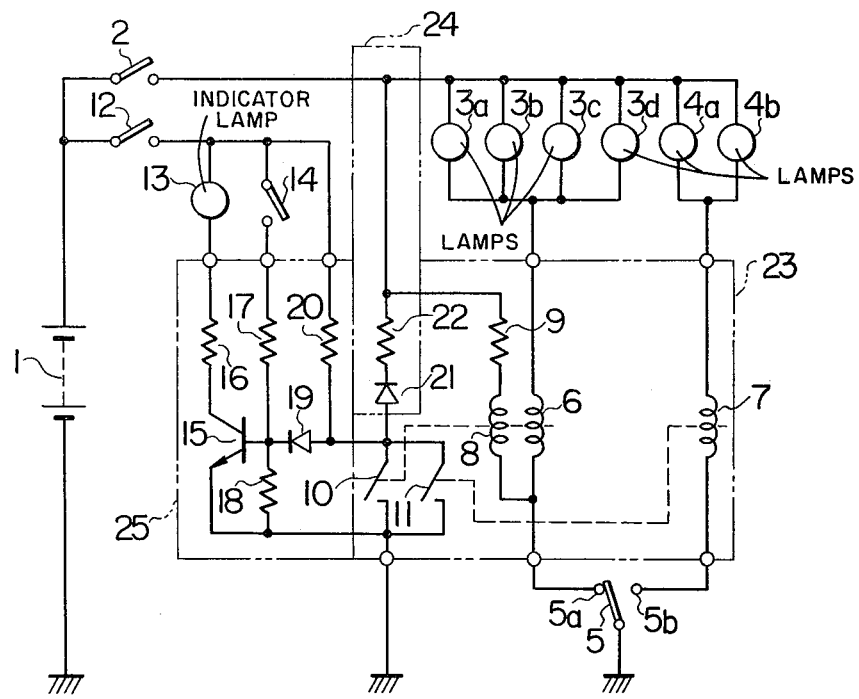
FIGS. 1, 2, 3, 4 and 5 are wiring diagrams showing respectively first, second, third, fourth and fifth embodiments of a monitoring system for an automobile light circuit according to the present invention.

Referring first to FIG. 1 showing a first embodiment of a monitoring system for an automobile light circuit according to this invention, numeral 1 designates a power source comprising a battery installed in a vehicle, 2 a light lighting switch (hereinafter referred to as a switch 2), 3a, 3b, 3c and 3d driving headlamps as lamps for illuminating the farside of the road in the direction of movement of the vehicle which are connected in parallel in this exemplary embodiment. Numerals 4a and 4b designate pass headlamps as lamps adapted to dim out when passing another car approaching the driver's car and connected in parallel in this exemplary embodiment. Numeral 5 designates a light change-over switch (hereinafter referred to as a switch 5) having a contact 5a for operating the driving headlamps 3a, 3b, 3c and 3d and a contact 5b for operating the pass headlamps 4a and 4b. Numerals 6 and 7 designate current coils respectively connected in series between the driving headlamps 3a, 3b, 3c and 3d and the contact 5a and between the pass headlamps 4a and 4b and the contact 5b to produce a magnetomotive force porportional to a headlight load current, 8 a voltage coil which, in the illustrated embodiment employing the four parallel connected driving headlamps 3a through 3d, is provided to improve the sensitivity of the current coil 6 and which produces a magnetomotive force opposite in polarity to the magnetomotive force of the current coil 6 to cancel a portion thereof. Numeral 9 designates a resistor connected in series with the voltage coil 8 for setting the magnitude of the magnetomotive force of the voltage coil 8 and for temperature compensation. The voltage coil 8 and the resistor 9 may be eliminated if only two parallel connected driving headlamps are used in place of the headlamps 3a, 3b, 3c and 3d which are the loads to be detected. Numerals 10 and 11 designate switches connected in parallel and grounded at one sides thereof. The switch 10 is closed by the current coil 6 and the voltage coil 8, while the switch 11 is closed by the current coil 7. Numeral 12 designates a key switch, 13 a monitoring indicator comprising for example an indicator lamp, 14 a check switch for the monitoring indicator 13 which is normally open and which is closed manually or by automatic means when a check is to be performed. Numeral 15 designates an NPN transistor, 16, 17, 18, 20 and 22 resistors, 19 and 21 diodes. The collector of the transistor 15 is connected to the monitoring indicator 13 through the protective resistor 16 and its emitter is grounded. The base leak resistor 18 is connected between the base and emitter of the transistor 15. The resistor 17 is connected between the base of the transistor 15 and the check switch 14. The reverse current blocking diode 19 is connected in the forward direction to the base of the transistor 15, and the base resistor 20 is connected in series with the key switch 12. The junction point of the diode 19 and the resistor 20 is connected to the nongrounded side of the parallel connected switches 10 and 11, and the diode 21 is connected in the reverse direction to the junction point of the diode 19 and the resistor 20 from the load side of the switch 2 and the resistor 22. Numeral 23 designates a headlight fault detecting circuit, 24 a supply cable fault detecting circuit, 25 a monitoring indicator operation control circuit.

With the construction described above, the operation of the monitoring system for an automobile light circuit according to the first embodiment will be described with reference to the case illustrated in FIG. 1 in which the light change-over switch 5 is connected to the driving headlamp contact 5a.

With the vehicle in motion, when the key switch 12 is closed so that current is supplied to the monitoring indicator 13 and the resistor 20, the transistor 15 is not turned on and hence the monitoring indicator 13 is not brought into operation since the junction point of the resistor 20 and the diode 19 is grounded through the diode 21, the resistor 22, the driving headlamps 3a, 3b, 3c and 3d, the current coil 6 and the switch 5. Here, resistor 20 has a resistance value on the order of KΩ and the resistance value of the resistor 22 is only about 10 Ω. Thus, the base of the transistor 15 can be considered substantially at the ground potential. However, if there is any defect in the circuitry such as the contact 5a of the switch 5 failing to close or the disconnection of the headlamps 3a, 3b, 3c and 3d and thus no current is supplied to the headlamps 3a to 3d, the base potential of the transistor 15 rises so that the transistor 15 is turned on and the monitoring indicator 13 comes into operation to give a warning and enable the driver to make the necessary repair before anything happens. When the circuit arrangements on the load side of the key switch 12 are in normal conditions, the monitoring indicator 13 does not operate. On the other hand, when the check switch 14 is closed, current is supplied to the base of the transistor 15 through the resistor 17 and thus the transistor 15 is forcibly turned on, permitting the driver to check the operation of the monitoring indicator 13.

When the lighting switch 2 is closed for night driving purposes, the driving headlamps 3a, 3b, 3c and 3d are turmed on. In this case, separating the switch 5 from the contact 5a and closing it to the contact 5b brings the pass headlamps 4a and 4b into operation.

In the conditions illustrated in FIG. 1, the driving headlamps 3a, 3b, 3c and 3d are turned on. This terminates the grounding through the diode 21 and the resistor 22. Thus, when the lit driving headlamps 3a through 3d are normally functioning, the switch 10 is closed by the current coil 6 and the base circuit of the transistor 15 is grounded. Consequently, the monitoring indicator 13 is not operated. On the contrary, if one or more of the operated driving headlamps 3a, 3b, 3c and 3d have become faulty, the flow of current to the current coil 6 decreases and the switch 10 is not closed. Consequently, the base circuit of the transistor 15 is not grounded so that the transistor 15 is turned on and the monitoring indicator 13 comes into operation to give an indication to the driver that some of the driving headlamps 3a, 3b, 3c and 3d have become defective. When the switch 5 is connected to the contact 5b for headlight dimming purposes so that the pass headlamps 4a and 4b are turned on, the switch 11 is closed by the current coil 7 and in the similar manner as abovedescribed the driver knows the occurrence of any faulty conditions of the pass headlamps 4a and 4b through the operation of the monitoring indicator 13.

Figure 2:
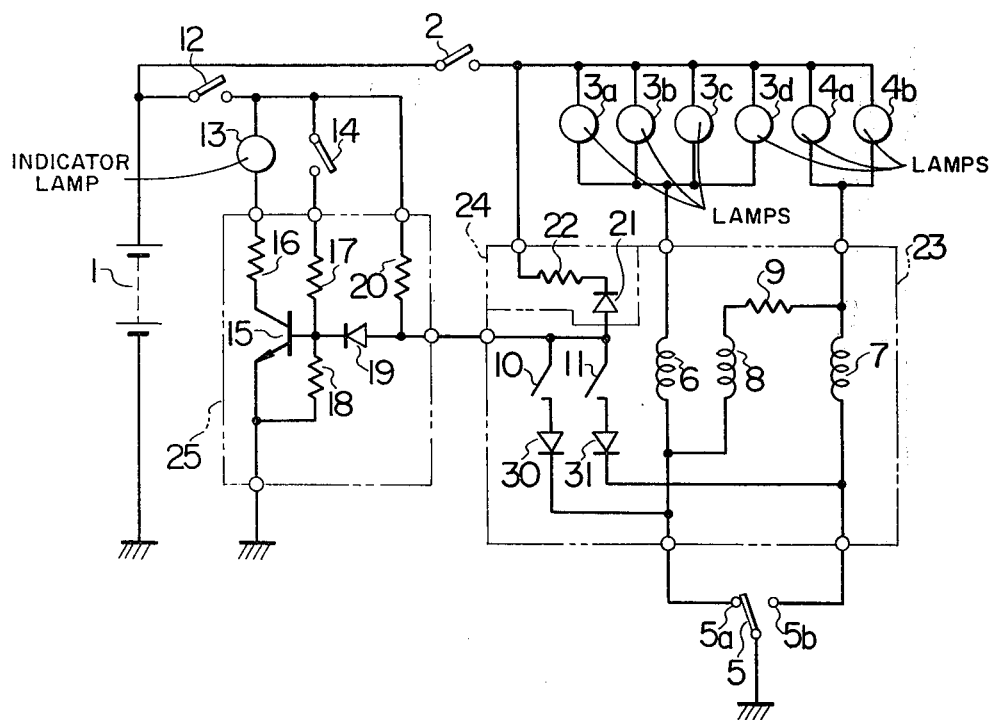

FIG. 2 illustrates a second embodiment of the monitoring system for an automobile light circuit of this invention. The second embodiment is identical with the first embodiment of FIG. 1, except that the voltage coil 8 and the resistor 9 are connected across the pass headlamps 4a and 4b and the current coil 6.

Figure 3:
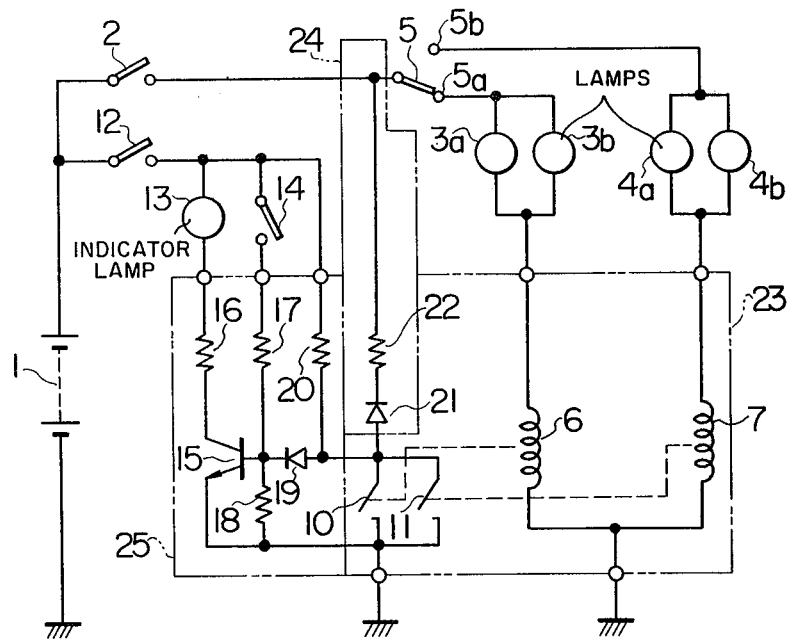

FIG. 3 illustrates a third embodiment of the monitoring system for an automobile light circuit of this invention, which is identical in construction and operation with the first embodiment of FIG. 1 except that the light change-over switch 5 is connected between the headlamps 3a and 3b and the light lighting switch 2, and that the voltage coil 8 is eliminated since there are only two driving headlamps 3a and 3b.

Figure 4:
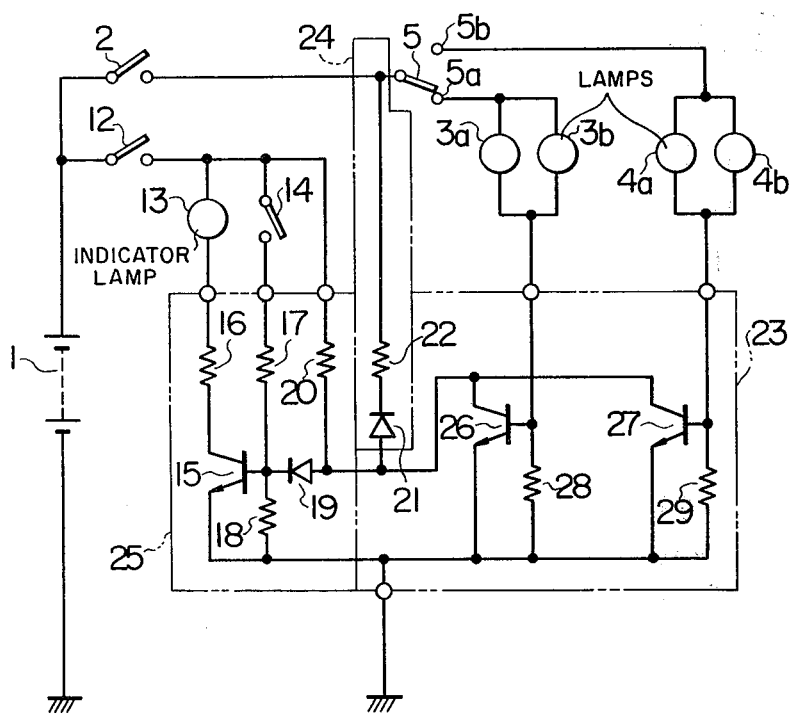

FIG. 4 illustrates a fourth embodiment of the monitoring system for an automobile light circuit according to this invention. The fourth embodiment differs from the third embodiment only in that the headlight fault detecting circuit 23 is composed of transistors and resistors.

The operation of the headlight fault detecting circuit 23 of FIG. 4 will now be described with reference to the illustrated case in which the light change-over switch 5 is closed to the contact 5a.

The base of a transistor 26 is set so that when both of the driving headlamps 3a and 3b are turned on, the transistor 26 is turned on by the potential divided by the resistance of the parallel connected headlamps 3a and 3b and the resistance of a resistor 28 and thus the base of the transistor 15 is grounded by the transistor 26. Consequently, the monitoring indicator 13 does not operate. On the other hand, when one of the headlamps 3a and 3b becomes faulty, the base potential of the transistor 26 drops and the transistor 26 is turned off. When this occurs, the transistor 15 is turned on and the monitoring indicator 13 comes into operation. Further, when both of the driving headlamps 3a and 3b become faulty or when any fault occurs in the circuits on the load side of the light lighting switch 2 so that no power is supplied to the driving headlamps 3a and 3b, the supply of the base current to the transistor 26 is cut off and the transistor 26 is turned off. Thus, the transistor 15 is turned on and the monitoring indicator 13 comes into operation.

Figure 5:
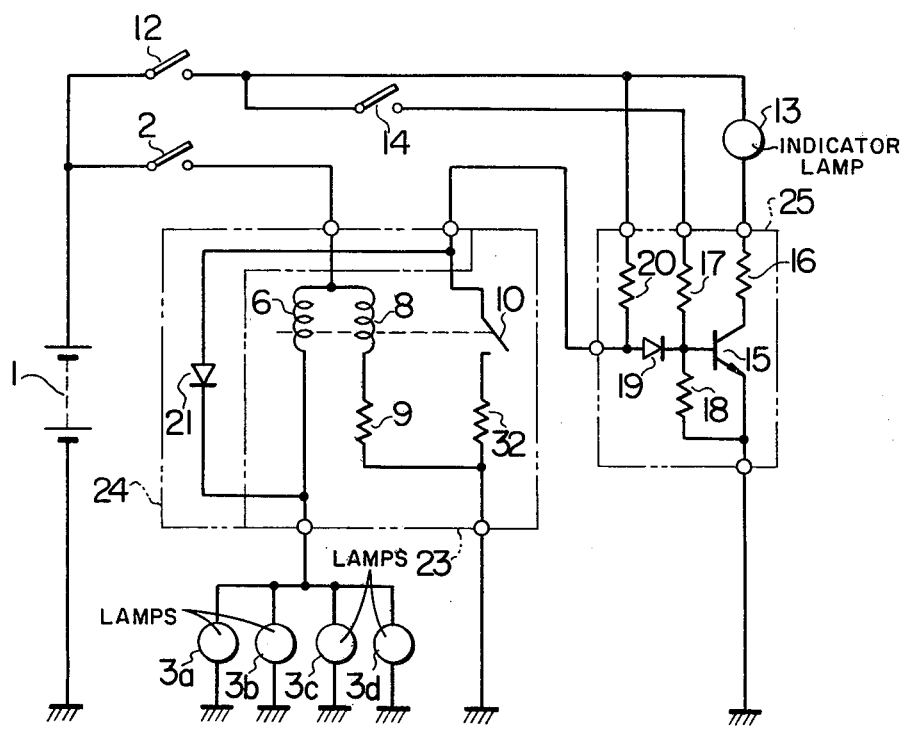

FIG. 5 illustrates a fifth embodiment of the monitoring system for an automobile light circuit according to this invention. The fifth embodiment differs from the first embodiment in that one side of the driving headlamps 3a through 3d for providing farside illumination are grounded, and that the pass headlamps 4a and 4b, the light change-over switch 5, the current coil 7 connected in series with the pass headlamps 4a and 4b and its switch 11 and the resistor 22 in the supply cable fault detecting circuit 24 are eliminated.

The fifth embodiment shown in FIG. 5 operates as follows. When the key switch 12 is closed and the check switch 14 is closed, the base current flows through the resistor 17 to the transistor 15 in the monitoring indicator operation control circuit 25 so that the transistor 15 is turned on and the indicator 13 is turned on. The resistance value of the resistor 16 is so small that it has no detrimental effect on the operation of the indicator 13 and the purpose of the resistor 16 is to protect the transistor 15. While the transistor 15 is arranged so that the base current is supplied through the resistor 20 and the diode 19 to the transistor 15 in response to the opening of the check switch 14, the junction point of the resistor 20 and the diode 19 is connected to the normally open switch 10 in the headlight fault detecting circuit 23 and the diode 21 so that when the light lighting switch 2 is open, the transistor 15 is not turned on since it is grounded through the diode 21 and the headlamps 3a through 3d and consequently the indicator 13 remains off. In this way, whether the indicator 13 functions normally may be checked by means of the check switch 14.

It is prearranged so that when all of the headlamps 3a through 3d properly operate in response to the closing of the light lighting switch 2, the normally open switch 10 is closed by the interaction between the current coil 6 and the voltage coil 8 and the resistor 9. In that case, therefore, the base circuit of the transistor 15 is grounded through the normally open switch 10 and a resistor 32 and hence the indicator 13 does not operate. On the other hand, it is prearranged so that if at least one of the headlamps 3a through 3d is faulty when the light lighting switch 2 is closed, the interaction between the current coil 6 and the voltage coil 8 and the resistor 9 does not cause the normally open switch 10 to close. Consequently, current is supplied to the base of the transistor 15 through the resistor 20 and the diode 19 and the transistor 15 is turned on to bring the indicator 13 into operation to give an indication of the fault. Further, even when the light lighting switch 2 is open, the occurrence of no-load conditions due to the headlamps 3a through 3d becoming faulty altogether or the dislocation of the connector causes the base potential of the transistor 15 to rise and thus the transistor 15 is turned on. In this way, it is possible to give an indication of faulty conditions even when the headlamps 3a through 3d are off.

Furthermore, while, in the fifth embodiment described above, four driving headlamps are used, the voltage coil 8 may be eliminated if only one or two driving headlamps are installed on a vehicle. Moreover, while the cathode side of the diode 21 is connected between the current coil 6 and the headlamps 3a through 3d, it may be connected between the light lighting switch 2 and the current coil 6.

I claim:

1. A monitoring system for an automobile light circuit including at least one lamp and a lamp lighting switch for supplying power to said lamp from a power supply, said monitoring system comprising:
    a current coil connected in series with said lamp;
    switch means for opening and closing in accordance with a magnetomotive force of said current coil;
    a transistor connected to said switch means for being switched on and off in accordance with the opening and closing of said switch means;
    a diode connected between said lamp and said switch means; and
    a monitoring indicator connected to said transistor.

2. A monitoring system for an automobile light circuit according to claim 1, wherein a voltage coil is connected in parallel with a series circuit comprising a plurality of said lamps and said current coil, said voltage coil producing a magnetomotive force for cancelling a portion of a magnetomotive force produced by said current coil.

3. A monitoring system for an automobile light circuit according to claim 1, further comprising a check switch connected between said power supply and the base of said transistor, and a reverse current blocking diode connected between the power supply side of said switch means and the base of said transistor in such a manner that the cathode of said diode is positioned on the base side of said transistor.

4. A monitoring system for an automobile light circuit according to claim 2, further comprising a check switch connected between said power supply and the base of said transistor, and a reverse current blocking diode connected between the power supply side of said switch means and the base of said transistor in such a manner that the cathode of said diode is positioned on the base side of said transistor.

5. A monitoring system for an automobile light circuit including a lamp and a lamp lighting switch for supplying power to said lamp from a power supply, said monitoring system comprising:
    a monitoring indicator;
    a monitoring indicator operation control circuit including a transistor adapted to be switched on and off for operating said monitoring indicator;
    a current coil connected in series with said lamp;
    switch means connected in parallel with the base-emitter circuit of said transistor and adapted to be operated by a magnetomotive force produced by said current coil; and
    a diode connected between the side of said switch means connected to the base of said transistor and the power supply side of said lamp in such a manner that the anode of said diode is positioned on said switch means side.

6. A monitoring system for an automobile light circuit according to claim 1, further comprising a series circuit of a lamp and another current coil connected in parallel with the series circuit of said lamp and said current coil, and another switch means for closing in accordance with a magnetomotive force of said another current coil.

7. A monitoring system for an automobile light circuit including at least one lamp and a lamp lighting switch for supplying power to said lamp from a power supply, said monitoring system comprising:
    a current coil connected in series with said lamp;
    switch means having an opened and closed state for shifting from one to the other state when all of said lamps are operative in accordance with a magnetomotive force of said current coil;
    a transistor connected to said switch means for switching between an on and off condition and shifting from one to the other condition when said switch means is in said one state in accordance with the opening and closing of said switch means;
    a diode connected between said lamp and said switch means for causing said transistor to shift from said one to said other condition when the current path through said lamp is broken and said lamp lighting switch is open; and
    a monitoring indicator connected to said transistor for providing a warning indication when said transistor shifts to said other condition.

8. A monitoring circuit for an automobile light circuit including at least one lamp and a lamp lighting switch for supplying power to said lamp from a power source comprising:
    an electronic switching means having an input for shifting between a conductive and non-conductive condition in response to an input signal,
    a diode connected between said lamp and said input to said switching means for causing said switching means to shift from one to the other condition when said diode connects a substantially ground voltage to said input via said lamp and said lamp lighting switch is open,
    switch means responsive to the current flowing through said switch for connecting a voltage of substantially ground to said input, when the current flowing through said lamp exceeds a predetermined value, so that said switching means shifts to said other condition, and
    indicator means connected to said switching means for providing a warning indication when said switching means is in said one condition.

9. A circuit as in claim 8 wherein said electronic switching means includes a transistor and said one state is a conductive state completing a current path through said indicator means.

10. A circuit as in claim 8 wherein said switch means is a transistor.

* * * * *